United States Patent

Sullivan et al.

[11] Patent Number: 5,887,051
[45] Date of Patent: Mar. 23, 1999

[54] LISTENING DEVICE FOR TRACING LINE CONTINUITY AND DETECTING TELEPHONE DIAL TONE

[75] Inventors: Robert W. Sullivan, Simi Valley; Lee A. Watkins, Thousand Oaks, both of Calif.

[73] Assignee: TEST-UM, Inc., Camarillo, Calif.

[21] Appl. No.: 900,212

[22] Filed: Jul. 24, 1997

[51] Int. Cl.[6] .................................................. H04M 1/24
[52] U.S. Cl. .................................................. 379/21; 379/27
[58] Field of Search .................................. 379/21–27, 30, 379/32, 22, 24, 26, 34

[56] References Cited

U.S. PATENT DOCUMENTS

| | | | |
|---|---|---|---|
| 4,922,516 | 5/1990 | Butler et al. | 379/21 |
| 5,025,466 | 6/1991 | Hilligoss et al. | 379/1 |
| 5,193,108 | 3/1993 | Stocklin | 379/21 |
| 5,703,928 | 12/1997 | Galloway et al. | 379/21 |

*Primary Examiner*—Paul Loomis
*Attorney, Agent, or Firm*—Gene W. Arant; Christopher R. Balzan

[57] ABSTRACT

A pocket-size hand-held testing tool is provided for testing the operation of telephone lines and tracing the location of electric wires, including a sound signal channel with an output speaker, a dial tone detection circuit for detecting a dial tone on a telephone line, a probe for capacitively receiving a signal from a particular wire in a bundled wire cable to identify that wire as one to which a tracing signal is being applied at the other end of the cable, and a momentary switch normally connecting the dial tone detection circuit into communication with the sound signal channel but manually depressable to instead selectively switch the probe into communication with the sound signal channel while disconnecting the dial tone detection circuit from it.

17 Claims, 8 Drawing Sheets

LISTENING DEVICE FOR TRACING LINE CONTINUITY AND DETECTING TELEPHONE DIAL TONE

BACKGROUND OF THE INVENTION

The present invention relates to the field of electrical wire continuity testing and telephone dial tone detection.

The common analog telephone line consists of two wires, a TIP wire and a RING wire. After a phone line has been installed, or when a problem with communication through existing lines arises, the lines must be checked to ensure proper functionality or to locate the source of the problem. It is common in the industry for a lineman, after installation, to use a butt set (or butt-in set) to listen for dial tone in order to verify proper operation of the line and to report line status to the office.

A butt set is essentially a portable telephone that the lineman carries, usually at his side. It commonly has clip leads so that the lineman can clip to pins in a B-box or cross-box to verify operation of the line at that point outside a building.

In this age of telecommunications, linemen often simply install a group of telephone lines to a building while other workers route the lines within the building. In addition, businesses now have their own management information systems (MIS) personnel who maintain their own internal telephone lines, as well as other computer and electrical related lines. For example, it is now common for MIS personnel or network installers to route wire for computers which could include bundles of wires containing, among others, telephone fax lines, telephone modem lines, local area network lines, wide area network lines, and printer lines. It is imperative that these lines be functional and correctly routed.

To verify proper installation of the telephone line within a building, the installer or troubleshooter connects a conventional phone or butt set to the line to verify the presence of a "dial tone". As it is becoming common for lines to have modular type receptacle connectors within the building, a breakout adapter must be connected to the modular connector so that the clip leads from the butt set can be attached. As such, then it is necessary to carry both a modular breakout adaptor along with the conventional butt set to listen for dial tone.

Quite often, an installer or troubleshooter also wants to trace wires, check continuity, or simply distinguish wires in a bundle. When this is the case, additional equipment must be used. In accordance with a known practice, an alternating electrical signal (or "tone") placed upon a particular wire at some remote location can then be detected, making it possible to identify that wire, confirm its electrical continuity, and trace its physical location. A special signal generator, sometimes called a "warbler", is used on the remote end of the particular wire to impress a high frequency signal which in audio form is easily distinguished from the telephone dial tone. At the other end of the wire a tone probe or detector may be used to identify the wire which carries that signal. In the industry, "tone" commonly refers to the high frequency warbler sound, while "dial tone" refers to the standard telephone dial tone.

Since equipment is expensive and is generally personally carried by the installer or troubleshooter, he must decide which equipment to purchase and carry, and which to leave behind, based on cost, size, and functionality. For instance, a simple continuity checker may be used, even though a tone probe is preferred and more functionally suited, simply because of cost and size concerns. In addition, the time lost locating and switching equipment could be used more productively. Furthermore, unlike a lineman, computer system installers or troubleshooters neither require all the functions available in a butt set to successfully complete their task nor would they prefer to carry a butt set and modular breakout adaptor if a better equipment is available.

The present invention, therefore, is based upon our recognition that there is a need for a more cost efficient, easy to use, and easily portable alternative to existing equipment.

SUMMARY OF THE INVENTION

An object of the present invention is to provide a compact lightweight listening device that may be selectively used for tracing line continuity or detecting telephone dial tone.

Another object of the invention is to provide a single tester adapted to provide audible indication of "dial tone", adapted to identify, trace, or make continuity check of trace wires or cables, and also adapted to provide a modular breakout which can be used with a butt set or tone generator.

Accordingly, the present invention provides an inexpensive, easy to use, and easily portable listening device designed to eliminate the need for a heavy and expensive butt set to listen for dial tone. At the same time, the present invention is adapted to provide a means to identify, continuity check, and trace wires. In its preferred form it also eliminates the need for a separate modular break-out adaptor.

Thus the present invention provides a pocket-size handheld testing tool for selectively testing the operation of telephone lines or tracing electrical wires. The tool includes a housing containing a sound signal channel and a speaker. A dial tone detection circuit has a pair of contacts for connection to the two wires of a telephone line for detecting a dial tone on that line and providing a signal to the sound channel. A probe on one end of the housing is adapted to detect a signal from a particular wire in a bundled wire cable so as to identify that wire as one to which a tracing signal is being applied. A momentary switch secured in the housing which normally connects the dial tone detection circuit into communication with the input of the sound signal channel is selectively operable for switching the probe into communication with the input of the sound signal channel while at the same time disconnecting the dial tone detection circuit from it.

DETAILED DESCRIPTION

It is presently preferred to provide a hand held listening device capable of being easily carried in a shirt or trouser pocket. It is also preferred to supply a tether loop so that it may be tethered to a belt loop. As such, it is presently preferred that a housing or casing for the invention be made of molded plastic of no greater length than about 5½ or 6 inches, and to provide a tether loop formed in the casing.

Figure 1:
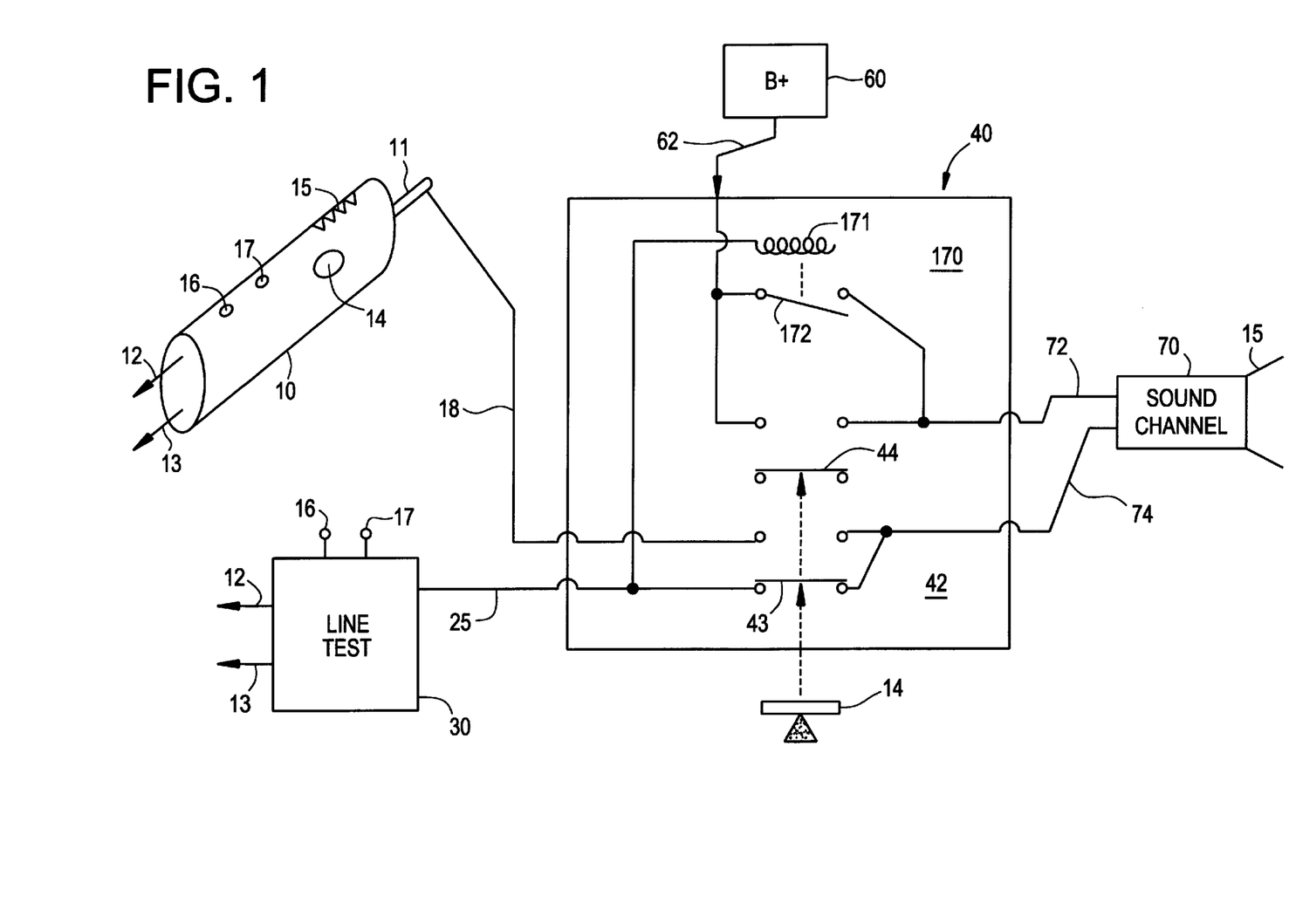
FIG. 1 is a conceptual perspective view of the physical form of our new listening device with its telephone line connectors, breakout terminals, sensing probe, selection switch, and loudspeaker, and also includes a drawing of the electrical system primarily in a one-line schematic form.

Referring now to the conceptual drawing of FIG. 1, the housing 10 of the device with a total length of about six inches or less is of such size and configuration as to be conveniently held in a person's hand and sufficiently small to be carried in a pocket. The housing 10 is elongated with a pointed end 11 which contains a sensing device for picking up tracing or "tone" signals by capacitive coupling or other means. Terminals 12, 13 accommodate connection to a modular telephone jack. Separate breakout terminals 16, 17, are also provided for connecting a butt set to the telephone line. An actuating button 14 is provided to actuate a momentary switch 42 of the type that remains depressed only while a force is exerted by the user. A speaker 15 forms the output of an internal sound channel 70.

In FIG. 1 the electrical circuitry of the listening device of the present invention is broadly illustrated by means of a conceptual schematic diagram in a primarily one-line form. In general, the circuitry of the device includes the sensing device 11, a Line Test Circuit 30, a Switching Circuit 40, an internal B+ battery 60, and a Sound Channel 70. The operation is such that either the Line Test Circuit 30 or the sensing device 11 may be selected for use. Switching Circuit 40 then provides proper connections for the signal, as well as for Battery 60 to furnish power to the Sound Channel 70.

More specifically, Line Test Circuit 30 includes the pair of terminals 12, 13, which are adapted to be engaged with a modular telephone jack of standard type, so as to then provide continuity to a pair of terminals within the jack that are understood to represent a two-wire telephone line. The principal function of Line Test Circuit 30 is to provide an electrical load for the telephone line so that the remotely located telephone central office switching equipment, in response thereto, will generate a dial tone which can be amplified and converted into audible sound by Sound Channel 70. Line Test Circuit 30 also includes the pair of breakout terminals 16, 17, for optional use with a butt set.

Within the Switching Circuit 40 there are the selection switch 42 and a line-actuated switch 170. The normal positions and modes of operation of these switches will now be described. The diagram of FIG. 1 shows the normally open position of both switches and assumes that only the signal side of each circuit is shown, the return other side not being specifically shown.

Switch 170 as conceptually shown in FIG. 1 may be a line-actuated single-pole single-throw switch which is normally open. Switch 170 has an operating coil 171 to which the signal output of line 25 from line test circuit 30 is at all times connected. In the normally open position of Switch 170 it does not connect power to anything. The detection of an off-hook current in line test circuit 30 is necessary in order to provide actuating power to the switch 170 and cause it to close. When the switch blade 172 of switch 170 is closed it connects D. C. power from battery 60 via power line 62 to the power input 72 of sound channel 70.

Selection switch 42 has two sets of double-pole double-throw contacts. The lower set of contacts controlled by lower blade 43 as shown in FIG. 1 will normally, in the undepressed position of the switch as shown, connect the signal line 25 to signal input 74 of Sound Channel 70. When switch 42 is depressed, the lower switch blade 43 then disconnects the signal line 25 from signal input 74, and instead connects line 18 from sensing device 11 to the signal input 74 of Sound Channel 70. In the normally undepressed position of the switch as shown, the upper switch blade 44 does not connect anything. When switch 42 is depressed, however, the upper blade 44 then connects power from power line 62 to the power input 72 of Sound Channel 70.

Thus, in the normal position of both switches, the switch connections are: the signal line 18 from sensing device 11 is not connected to the signal input line 74 of sound channel 70; the signal line 25 from Line Test Circuit 30 is connected through switch blade 43 to the signal input line 74 of sound channel 70; power circuit 62 connects battery 60 to one side of the open switch 170; and signal line 25 from line test circuit 20 is connected to the actuating coil 171 of line-actuated power switch 170.

A feature of the invention is that Switching Circuit 40 allows signals from either the Line Test Circuit 30 or the Probe 11 to flow to Sound Channel 70. To detect dial tone on a telephone line, Line Test Circuit 30 is used. When it is desired to detect a tracing signal or "tone" with the sensing device 11, the button 14 controlling selection switch 42 of the momentary type is selectively depressed by the operator.

When dial tone on a telephone line is to be detected, the terminals 12 & 13 are engaged with a modular telephone jack of standard type. Line Test Circuit 30 then provides an electrical load for the telephone line, and the remotely located telephone central office switching equipment generates a dial tone indicating an off-hook condition. A signal representative of that condition is supplied to actuating coil 171 of switch 170, causing switch blade 172 to close. The dial tone signal is then amplified and converted into audible sound by Sound Channel 70.

To use Probe 11 rather than the Line Test Circuit 20 the button 14 of momentary switch 42 is depressed. Assuming that the listening device is not connected to a phone line the switch 170 would then still be open. Within Switching Circuit 40, the signal line 18 from probe 11 then becomes connected to signal input circuit 74 of Sound Channel 70. Power from battery 60 via power circuit 62 also becomes connected to the power input 72 of Sound Channel 70. As a result, any signal picked up by sensing device 11 appears as audible sound from the speaker 76.

Physical Form of the Listening Device

Figure 2A:
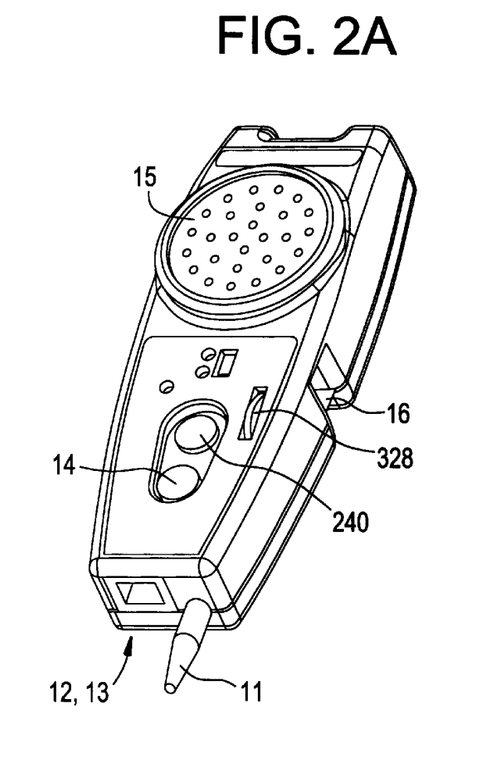
FIGS. 2a, 2b, and 2c are perspective views of the presently preferred physical form of the listening device.
Figure 2B:
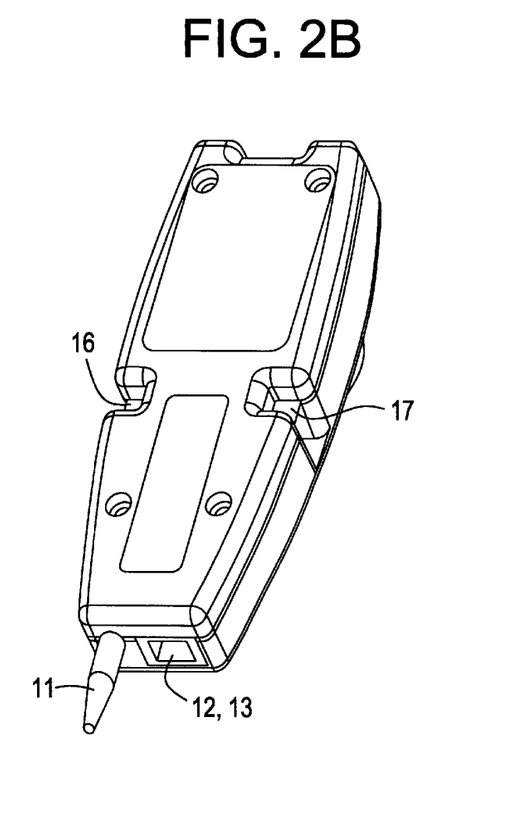
Figure 2C:
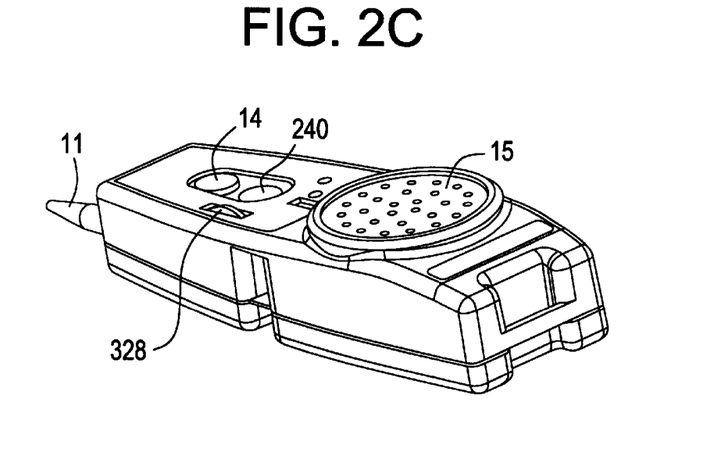

Reference is now made to FIGS. 2a, 2b, and 2c which illustrate the presently preferred physical configuration of the listening device in accordance with the invention.

FIG. 2a is a perspective view of the device looking down from the probe end; FIG. 2b is a perspective view of the bottom side of the housing 10; and FIG. 2c is a perspective view taken from the speaker end of the housing.

FIG. 2 shows the presently preferred physical configuration of our novel listener device. The probe 11 with sensor contained therein projects from one end of the case or housing 10. As shown in FIGS. 2b and 2c beside the probe 11 there is a standard telephone line receptacle that contains the terminals 12 and 13.

On the top side of the case or housing as seen in FIGS. 2a and 2c, the speaker 15 is located near the end opposite to the location of probe 11. Midway between speaker 15 and probe 11 there are two push buttons 240 and 14. Button 14 controls the depressable switch 42 as previously described. Button 240 controls a two-position switch known as the "listen switch".

On the top side of the case or housing near the button 240 there is a volume adjust knob 328, which permits the operator to manually adjust the sound volume of sound channel 70.

The Listen Switch

The listen switch is placed in series with the signal line 25 from line test circuit 30, or in an equivalent position inside the line test circuit. The listen switch is a beneficial accessory which permits greater versatility in the use of the device. For example, when terminals 12, 13 are attached to what is presumably a pair of wires representing a telephone circuit, the listen switch may be set in its closed position while the workman moves to another location and rearranges circuit connections or the like. In other words, the listen switch is not of the momentary type, but may be locked into either an "on" position or an "off" position. The listen switch also assists in protecting battery 60 from possible unwanted and inadvertent current drain.

FIG. 3

Figure 3A:
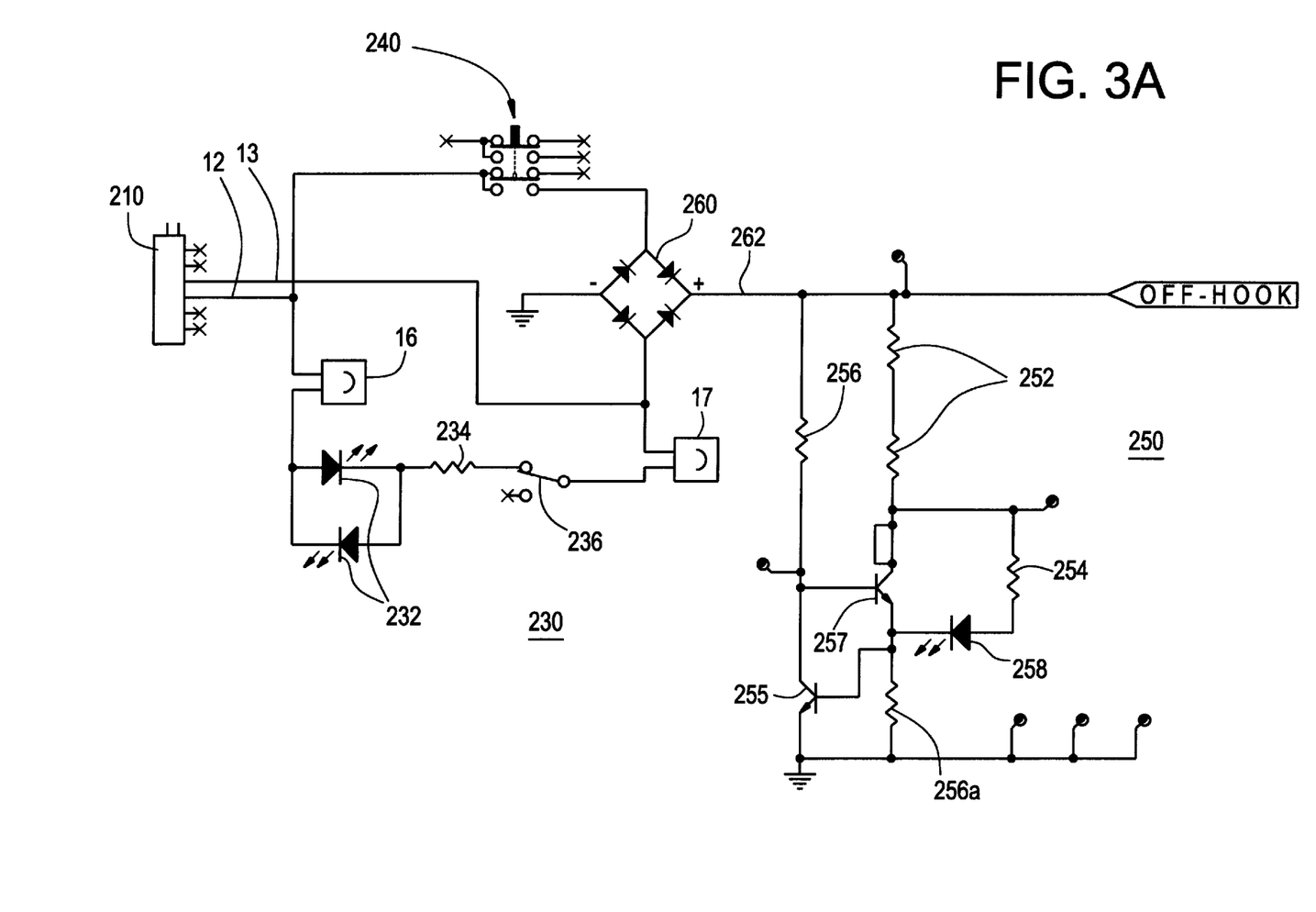
FIGS. 3A, 3B, 3C, & 3D are a schematic drawing of the presently preferred electrical circuit of the device.

FIGS. 3A–3D are detailed circuit diagrams of the presently preferred embodiment. Referring to FIG. 3A, modular connector 210 containing TIP wire 12 and RING wire 13 are coupled to diode bridge rectifier 260. The bridge rectifier is used so that if the TIP and RING lines 12 & 13 are inadvertently interchanged, the polarity sensitive load will have the correct polarity at the rectifier output 262. The TIP line 12 is shown coupled to the rectifier 260 via the listen or off-hook switch 240. Depression of the off-hook switch 240 allows current draw through the load creating a subsequent dial tone, which will cause audible sound at the speaker, shown in FIG. 3D as 15, provided the trace switch, shown in FIG. 3C as 14, is not also depressed.

As it is thought desirable to be able to connect the present invention to the phone line and check for loose connections by walking across the room if necessary to jiggle the wires, the presently preferred embodiment provides a two position switch 240 so that the TIP line 12 to rectifier 260 connection may be maintained while the invention is not in the operator's hand. Although it is presently preferred to couple the TIP line 12 to the bridge rectifier 260 via listen or off-hook switch 240, the TIP line may be directly coupled to the rectifier 260.

With the presently preferred embodiment, the TIP and RING lines 12 & 13 are also coupled to the polarity indicator circuit 230 via terminals 16 &17. Terminals 16 & 17 are provided to provide a breakout so that clip leads may be attached. This allows for connection of a butt set or a tone generator.

The break-out terminals 16 & 17 are connected in series with the polarity indicator circuit 230. By doing so, the proper functionality of the break-out terminals 16 & 17 can be tested after manufacture by simply connecting to a phone line. As two polarity indicators are provided, the illumination of one ensures that the terminals have been connected properly. Hence, a separate terminal functionality test can be eliminated thereby reducing manufacturing time.

Also, with the presently preferred embodiment, the indicator circuit has two indicator lights or LEDs 232 which indicate the direction of current flow through the polarity circuit 230 when the switch 236 is closed. The polarity circuit 230 has a 10k resistor 234 to limit the current through the LEDs 32.

In the presently preferred embodiment, the bridge rectifier output 262 is connected to load circuit 250. The load circuit 250 provides a means for creating dial tone and a means for indicating when the device has been connected to a phone line capable of delivering current in excess of a specified limit. Although the present invention can be used with digital, as well as analog phone lines, for cost and size considerations it is currently preferred to select the load resistors sufficient only for loading analog phone lines. Analog phone lines can deliver up to the specified limit of 80 milliamperes whereas digital lines may deliver 100's of milliamperes. As such, load resistors 252 are selected as two 100 ohm, 0.5 watts each, series connected resistors 252, and a load resistor protection circuit 254 is provided to prevent and indicate load resistor overload.

For the load protection circuit 254, it is presently preferred to use two NPN type transistors. A first or primary load transistor 257 is connected so that its base is coupled to the rectifier output 262 via a 3.3k bias resistor 256. The primary transistor 257 collector is coupled to the rectifier output via the load resistance 252 and the primary transistor 257 emitter is coupled to ground via a current sense resistor 256A.

A by-pass transistor 255 is connected so that its base is connected to the primary transistor 257 emitter. The by-pass transistor 255 collector is coupled to the rectifier output 262 via the bias resistor 256 and the by-pass transistor 255 emitter is directly coupled to ground.

The current sense resistor 256A is selected at 10 ohms so that when the current through the load resistance 252 exceeds approximately 80 milliamperes, the by-pass transistor 255 turns on to limit current flow through the load resistance 252 by limiting the base current of primary transistor 257.

An over load indicator light or LED 258 is provided across the primary load transistor 257 to indicate when the by-pass transistor 255 is turned on. As the by-pass transistor 255 turns on, the primary transistor 257 turns partially off and current flows through the LED 258 thereby illuminating it and indicating load current in excess of approximately 80 milliamperes.

Although it is presently preferred to provide the load circuit 250 thus explained with an active current source and indicator light, a circuit breaker or fuse could also be used to provide over current protection and indication. Furthermore, the load circuit could contain a high wattage resistor capable of handling the over current, either with or without an indicator circuit.

Application of the load will cause the dial tone or off-hook indication to appear at the bridge rectifier output 262. The dial tone can then be applied to the sound channel, shown in FIG. 3D as 70, to produce an audible indication.

Figure 3B:
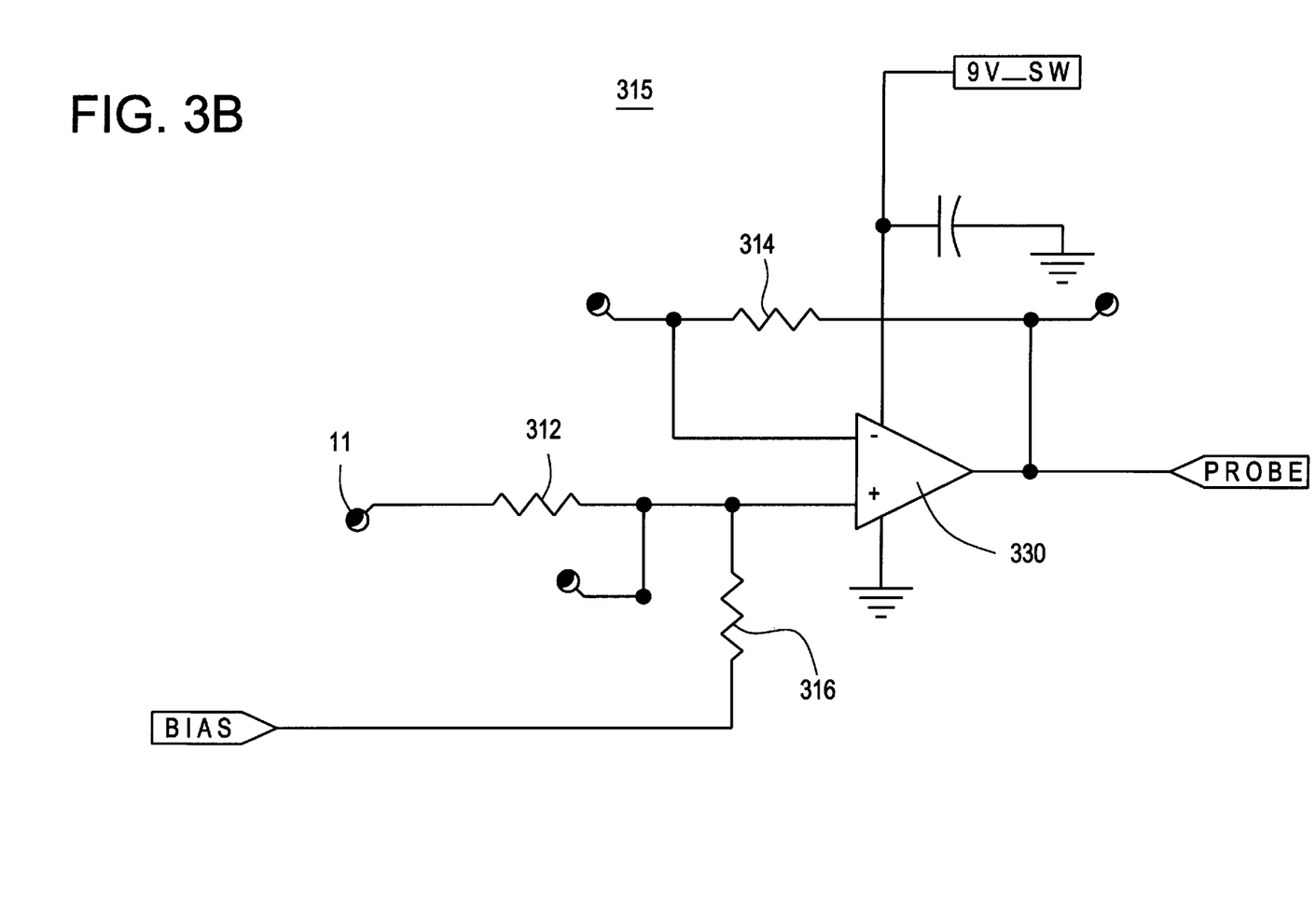
Figure 3C:
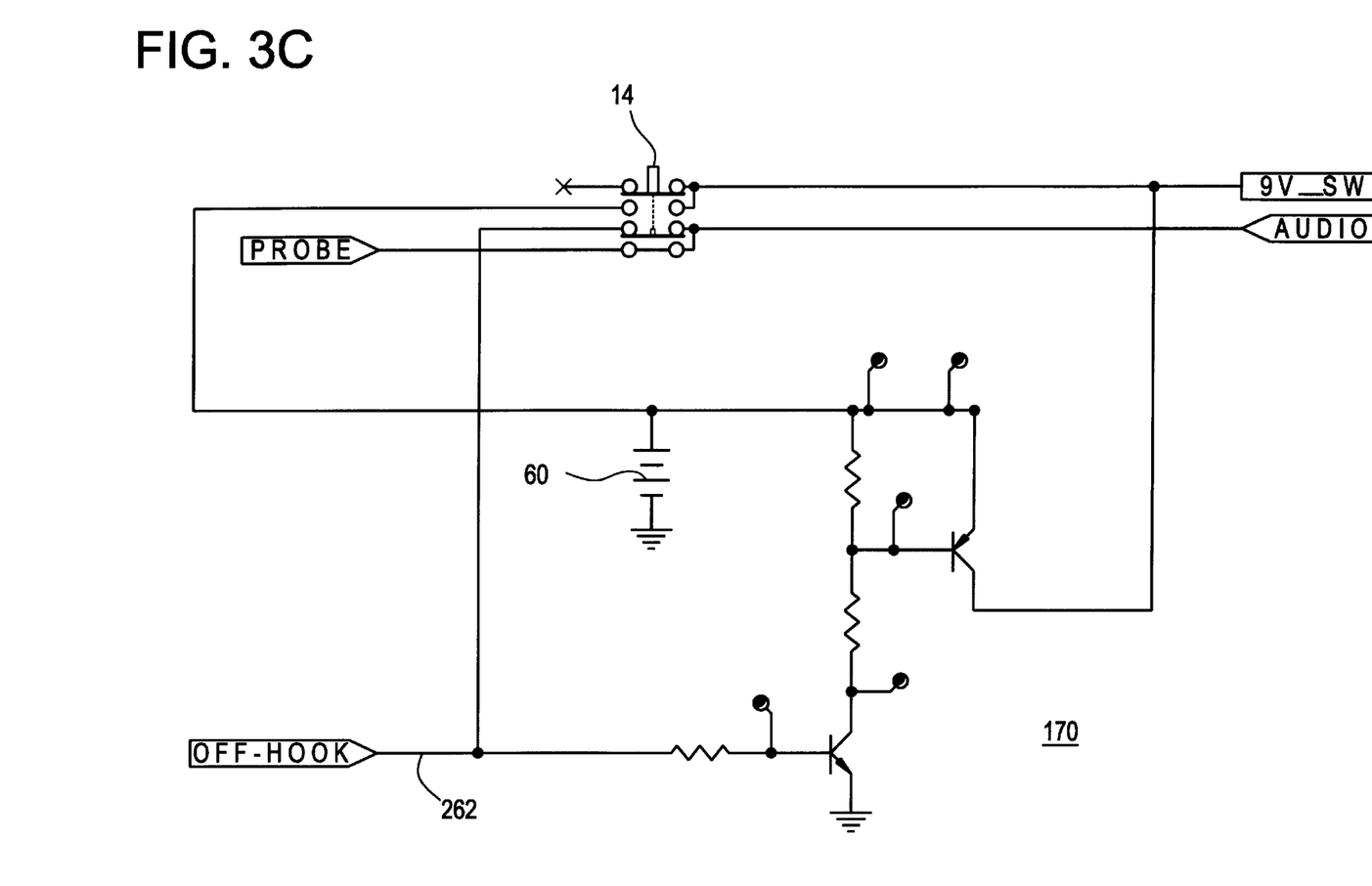
Figure 3D:
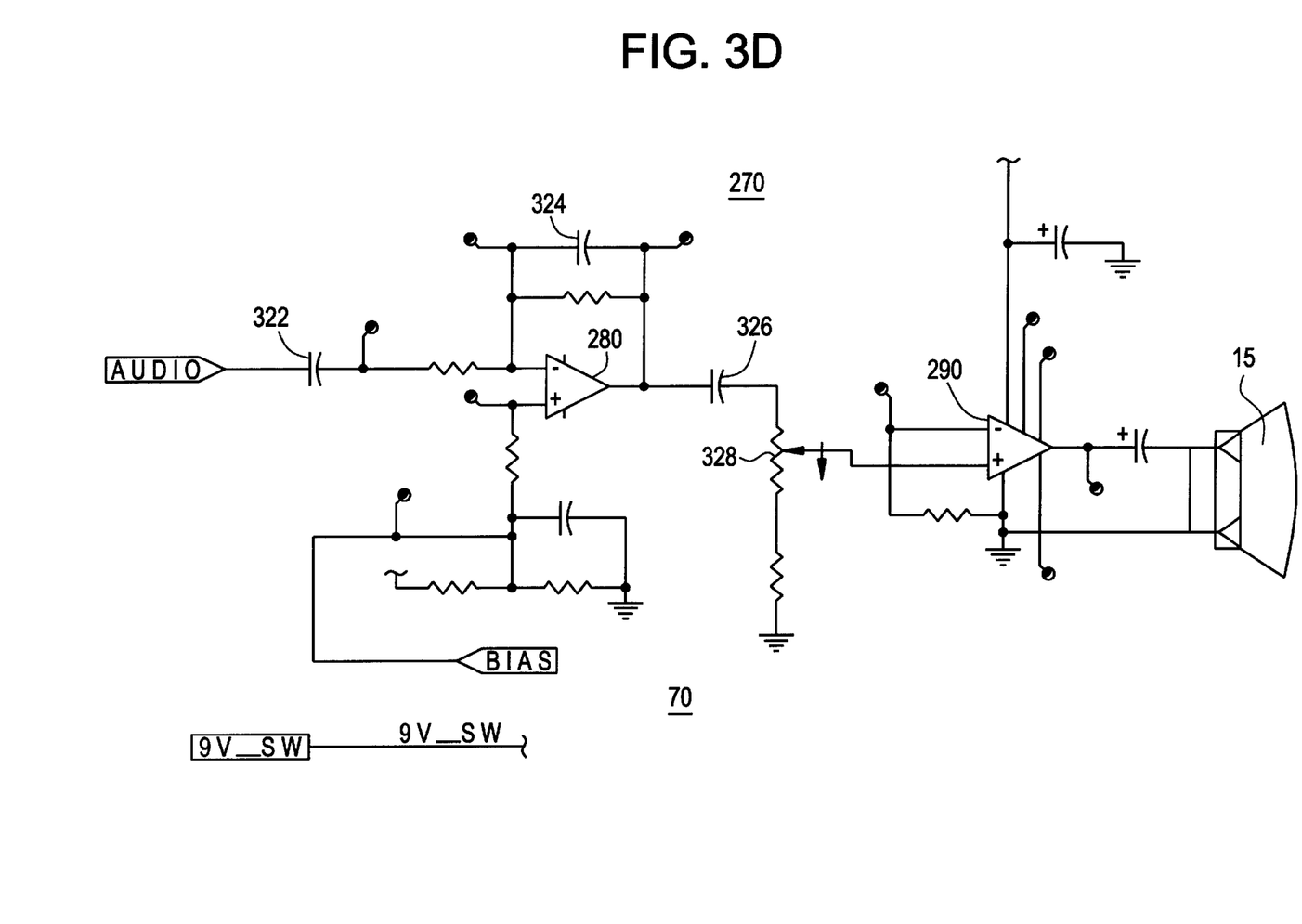

Referring to FIG. 3D, it is presently preferred that the sound signal channel have an amplifier circuit 270 and a speaker 15 that produces an audible sound. The dial tone is supplied to the amplifier 270 which in turn produces a signal that is supplied to the speaker 15. It is presently preferred to provide a two stage amplifier circuit. As such, the amplifier circuit 270 has a gain stage 280 and a power amplifier 290. A single stage amplifier could be used provided an efficient speaker 15 is selected. It is presently preferred, however, to select a less efficient and less expensive speaker and use a two stage amplifier. A factor in selecting a two stage amplifier is that one part of an LM358 with two operational amplifier stages is used as a high impedance buffer for the probe and the other part as the gain stage 280.

The inverting input of the gain stage amplifier 280 is capacitively coupled to the trace switch, shown in FIG. 3C as 14, via a 0.1 microfarad capacitor 322. The non-inverting input is biased at 3 volts so that the LM358 responds linearly to dial tone and probe detected signals. A 1000 picofarad capacitor 324 is provided as a low pass filter. The output of the gain stage is supplied to the non-inveriting input of the power amplifier 290 via a 0.1 microfarad capacitor 326 and a 10k ohm variable resistor 328.

The capacitors 322, 324 & 326 provide a band pass filter. The bandpass filter has a double pole lower cut off of 200 Hz with a 12 db/octave reduction below 200 Hz and an upper cut off of 3.2 kHz with a 6 db/octave reduction above 3.2 kHz.

The variable resistor 328 provides a means for adjusting the speaker 15 output volume by adjusting the signal level into the power amplifier 290. Because varying strength probe detected signals or dial tone signals may be output by speaker 15, it is presently preferred to allow the user to adjust the volume. For volume control, a finger actuated rotary type potentiometer, which may be adjusted with a finger of the hand that is holding the device, is provided.

Referring to FIG. 3B, tone probe 11 signals are coupled to the non-inverting input of the high impedance buffer 330 via a 1 M ohm protection resistor 312. It is presently preferred that a type LM358, be configured using 4.7 M ohm resistors 314 & 316, to provide the high impedance buffer 330. The non-inverting input is biased at 3 volts to bias buffer 330 in the linear operating area. The output of the buffer 330 is supplied to the trace switch, shown in FIG. 3C as 14, where it may, upon depression of the trace switch, be supplied to the amplifier circuit 270 and speaker 15 shown in FIG. 3D.

Referring to FIG. 3C, it is presently preferred to energize the probe circuit 315 and the sound channel circuit, shown in FIG. 3D as 70, using an internal 9 volt battery 60. It is also preferred to utilize power switching circuitry to conserve battery power and to ensure that battery power is not inadvertently left on.

The power switching circuitry supplies power through the trace switch 14 or through the off hook activated line circuit 170. With the momentary trace switch 14 in the normal undepressed position, power flows to the probe circuit 315 and the sound channel 70, only if an off-hook activated switch circuit 170 has been enabled.

The off-hook activated switch circuitry 170 is enabled when voltage is detected at the rectifier output 62. Therefore, after the listen switch, shown in FIG. 3A as 240, has been closed and voltage is detected at the rectifier output 262, the off-hook line activated switch circuit 170 energizes the probe circuit, shown in FIG. 3B as 315, and the sound channel, shown in FIG. 3D as 70. The dial tone induced by the load circuit, shown in FIG. 3A as 250, is supplied to the now energized sound channel, shown in FIG. 3D as 70, to produce an audible output.

Alternatively, in the depressed position, the trace switch 14 allows power to flow to the probe circuit 11 and the sound channel 70. Thereby allowing probe detected signals to be audibly output by the now energized sound channel.

ALTERNATE EMBODIMENT (FIG. 4)

Figure 4A:
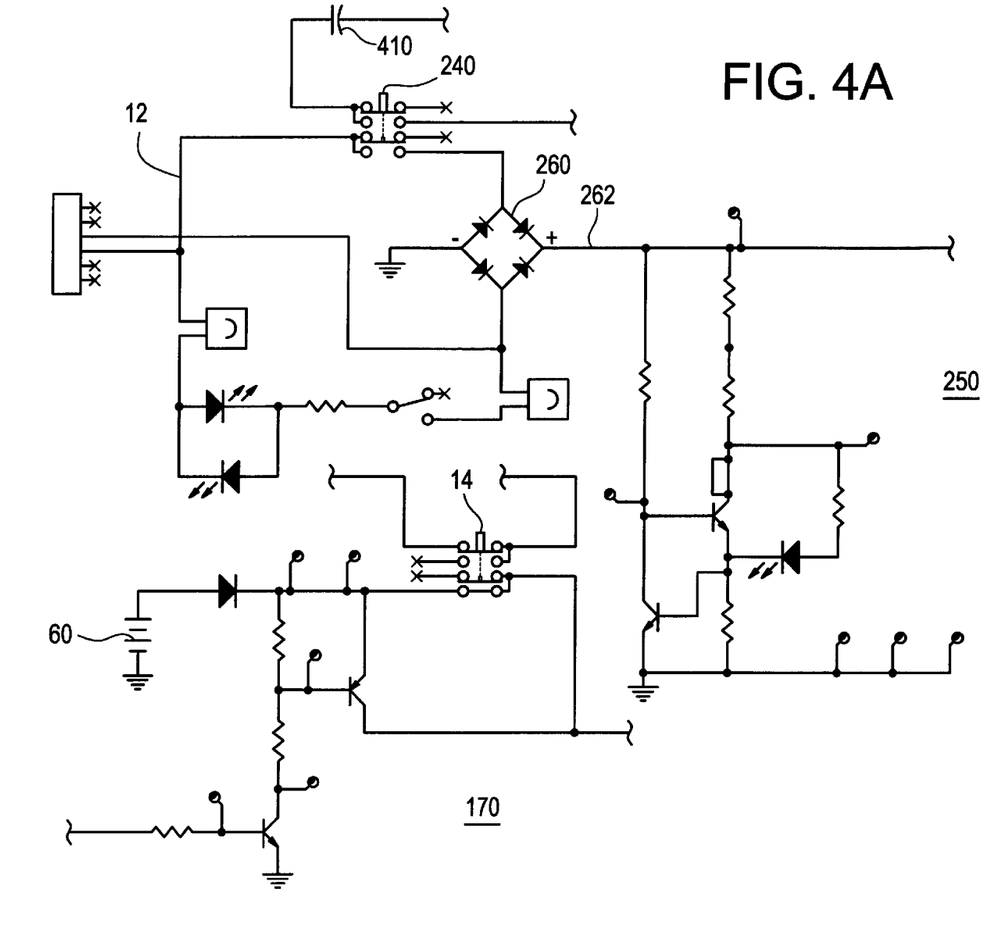
FIG. 4 is a schematic drawing of an alternate form of the present invention.
Figure 4B:
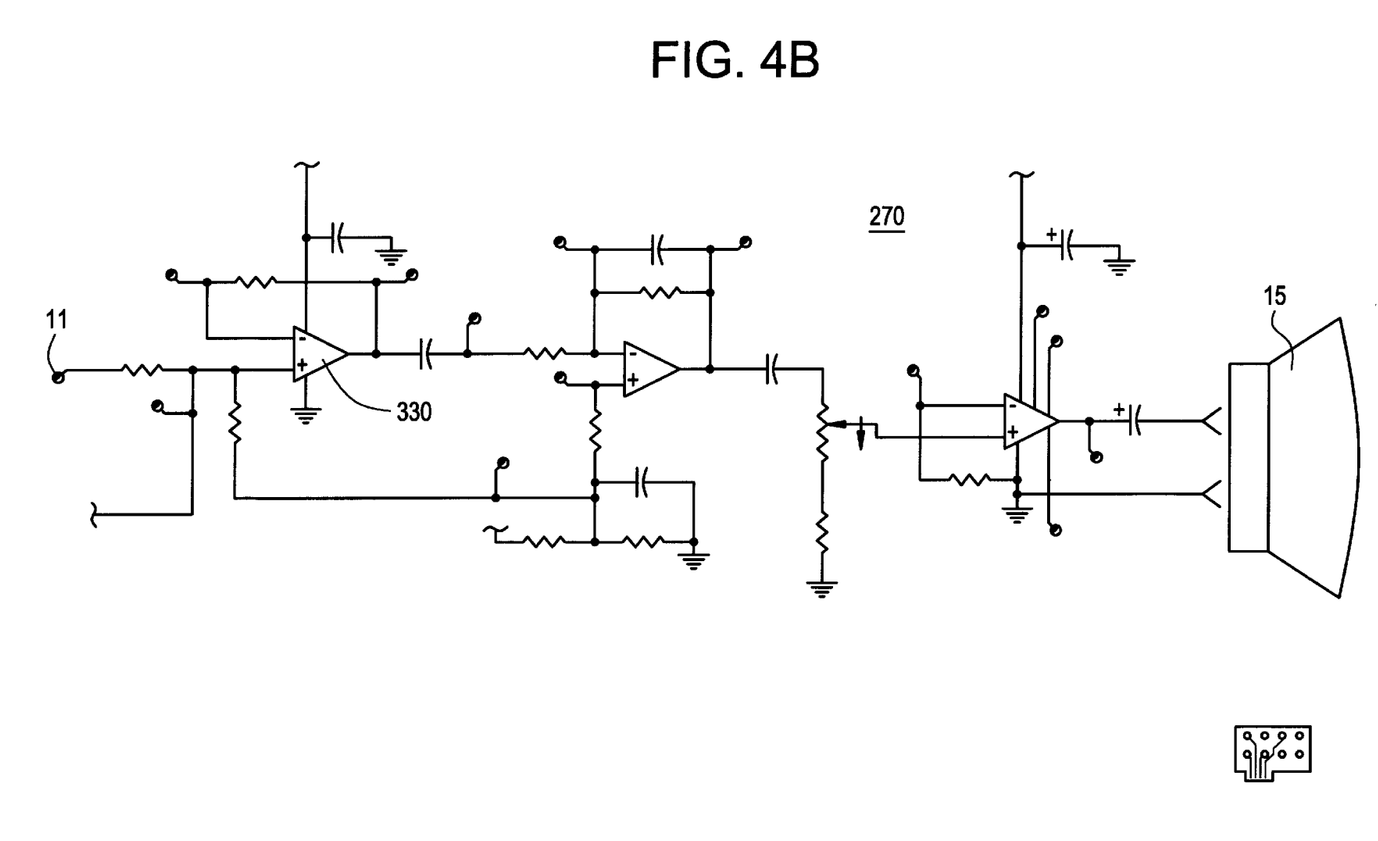

FIG. 4 shows an alternate embodiment of the invention. The alternate embodiment differs from the preferred embodiment in that the loaded rectifier output 262 or off hook signal is coupled via the listen switch 240, a shunt capacitor 410, and the trace switch 14, to the high impedance buffer 330 prior to connection to the amplifier circiut 270. As such, both the probe 11 and the loaded rectifier output 262 are coupled to the buffer 330.

In this embodiment, not only does depression of the listen switch 240 causes the TIP line 12 to be connected to the bridge rectifier circuit 260, but also causes the rectifier output 262 to be connected, via the shunt capacitor 410 and the non depressed trace switch 14, to the buffer 330. In this way, dial tone is audibly output at the speaker 15.

In this embodiment, not only does depression of the momentary trace switch 14 connect the battery 60 to the buffer 330 and amplifier circuit 270, but it also disconnects the dial tone circuit and shunt path from the buffer 330. This allows tone probe detected signals to be audibly output at the speaker 15 without being swamped by the dial tone.

The value of the shunt capacitor is selected at 0.1 microfarad to allow the dial tone signal to pass and also to provide a shunt path for probe detected signals through the load circuit 250 to ground. Therefore, if the listen switch 40 is depressed and the trace switch 14 is not depressed, probe signals are shunted to ground via the load circuit 250 rather than fed to the high impedance buffer 330. If the trace switch 14 is depressed, the dial tone signal and shunt path are disconnected from the buffer 330 and the probe signals are detected and amplified by the now powered buffer 330 and amplifier circuit 270.

As with the preferred embodiment, the buffer 330 and amplifier circuit 270 may also be powered with the off hook line activated switch circuit 170.

It is also possible, in keeping with the teaching of the invention, to use a single three position momentary rocker type switch to: toggle to select dial tone or probe detected tones; switch power to the sound channel when the dial tone or probe tone positions are selected; and, if desired, connect the load circuit to the phone line when the dial tone position is selected.

While only several embodiments of the invention have been described, numerous modifications or other embodiments could be made without deviating from the invention thus described and in the following claims.

What we claim is:

1. A multi-function tester for testing analog phone lines having a TIP line and a RING line, the tester comprising:
    a) a bridge rectifier circuit having two inputs and an output, one of the inputs being capable of being coupled to the TIP line and the other being capable of being coupled to the RING line so that no matter which of the two lines has power applied, current flows to the output;
    b) a load circuit coupled to the bridge rectifier output, the load circuit having an over-current protection circuit so as to prevent load circuit destruction should the tester be accidentally attached to wire capable of delivering current in excess of that normally found on analog phone lines;
    c) a probe capable of remotely detecting electro-magnetic signals;
    d) an amplifier circuit having a input and an output, the input being coupled to both the loaded rectifier output and to the probe, the amplifier being capable of detecting, amplifying, and producing an output in response either to the rectifier output or to probe detected signals, the amplifier circuit being capable of selectively amplifying signals based on the frequency of the signals, the probe being coupled to the amplifier via a high impedance buffer having an input and an output, the buffer input being coupled to the probe and the buffer output being switchably connected to the amplifier input; wherein the rectifier output is also switchably connected to the amplifier input so that either the buffer output signal or the rectifier output signal can be selected for input to the amplifier; and e) a speaker coupled to the amplifier output capable of producing an audible response to amplifier output signals.

2. A multi-function tester for testing analog phone lines having a TIP line and a RING line, the tester comprising:
   a) a bridge rectifier circuit having two inputs and an output, one of the inputs being capable of being coupled to the TIP line and the other being capable of being coupled to the RING line so that no matter which of the two lines has power applied, current flows to the output;
   b) a load circuit coupled to the bridge rectifier output, the load circuit having an over-current protection circuit so as to prevent load circuit destruction should the tester be accidentally attached to wire capable of delivering current in excess of that normally found on analog phone lines;
   c) a probe capable of remotely detecting electro-magnetic signals;
   d) an amplifier circuit having a input and an output, the input being coupled to both the loaded rectifier output and to the probe, the amplifier being capable of detecting, amplifying, and producing an output in response either to the rectifier output or to probe detected signals, the amplifier circuit being capable of selectively amplifying signals based on the frequency of the signals;
   e) a speaker coupled to the amplifier output capable of producing an audible response to amplifier output signals; and
   the tester further comprising a power source and a power switching circuit, the power source being coupled to the amplifier circuit and to the buffer via the power switching circuit, the power switching circuit further comprising an off-hook activated switch circuit and a momentary type trace switch, the power switching circuit being capable of providing power to both the amplifier circuit and the buffer either when the rectifier output current turns on the off-hook switch circuit or when the trace switch is closed.

3. A multi-function tester for testing analog phone lines having a TIP line and a RING line, the tester comprising:
   a) a bridge rectifier circuit having two inputs and an output, one of the inputs being capable of being coupled to the TIP line and the other being capable of being coupled to the RING line so that no matter which of the two lines has power applied, current flows to the output;
   b) a load circuit coupled to the bridge rectifier output, the load circuit having an over-current protection circuit so as to prevent load circuit destruction should the tester be accidentally attached to wire capable of delivering current in excess of that normally found on analog phone lines;
   c) a probe capable of remotely detecting electro-magnetic signals;
   d) an amplifier circuit having a input and an output, the input being coupled to both the loaded rectifier output and to the probe, the amplifier being capable of detecting, amplifying, and producing an output in response either to the rectifier output or to probe detected signals, the amplifier circuit being capable of selectively amplifying signals based on the frequency of the signals;
   e) a speaker coupled to the amplifier output capable of producing an audible response to amplifier output signals; and
   the tester further comprising a polarity indicator circuit comprising two leads, one of the leads being coupled to the TIP and the other to the RING, the polarity indicator circuit being capable of indicating which of the two lines has power applied, the polarity circuit having two terminals for connecting clip leads, the terminals being serially connected with the rest of the polarity circuit so that an indication that either of the lines has power applied also indicates that one of the terminals is connected to the TIP line and the other to the RING line.

4. A multi-function tester for testing analog phone lines having a TIP line and a RING line, the tester comprising:
   a) a bridge rectifier circuit having two inputs and an output, one of the inputs being capable of being coupled to the TIP line and the other being capable of being coupled to the RING line so that no matter which of the two lines has power applied, current flows to the output;
   b) a load circuit coupled to the bridge rectifier output, the load circuit having an over-current protection circuit so as to prevent load circuit destruction should the tester be accidentally attached to wire capable of delivering current in excess of that normally found on analog phone lines; wherein the load circuit further comprises a load resistor having a first and a second end, the first end being connected to the rectifier output, and wherein the over-current protection circuit comprises a by-pass transistor having a base, an emitter, and a collector, the transistor base being coupled to the second end of the load resistor and resistively coupled to ground via a threshold resistor, the transistor collector being coupled to the rectifier output, the transistor emitter being coupled to ground, the threshold resistor having a value such that it causes the transistor to turn on and limit the current through the load resistor so as to prevent it from being exposed to current in excess of its specified limit;
   c) a probe capable of remotely detecting electro-magnetic signals;
   d) an amplifier circuit having a input and an output, the input being coupled to both the loaded rectifier output and to the probe, the amplifier being capable of detecting, amplifying, and producing an output in response either to the rectifier output or to probe detected signals, the amplifier circuit being capable of selectively amplifying signals based on the frequency of the signals; and
   e) a speaker coupled to the amplifier output capable of producing an audible response to amplifier output signals.

5. The tester of claim 4 wherein the over-current protection circuit further comprises a primary load transistor having a base, an emitter, and a collector, the primary transistor base being coupled to the rectifier output, and wherein the by-pass transistor base is coupled to the load resistor via the primary transistor so that the by-pass transistor base is coupled to the primary transistor emitter and the primary transistor collector is coupled to the second end of the load resistor, and wherein the load circuit further comprises an indicator light coupled across the primary transistor's collector and emitter so that when the by-pass transistor turns on, the indicator light illuminates.

6. A multi-function tester for testing phone lines having a TIP line and a RING line, the tester comprising:
   a) a modular plug-in connector;
   b) a polarity indicator circuit comprising two leads, one of the leads being coupled to the TIP line via the modular connector and the other to the RING line via the modular connector, the polarity indicator circuit being capable of indicating which of the two lines has power applied;

c) two clip lead terminals, one terminal coupled to the TIP line and the other to the RING line;

d) a bridge rectifier circuit having two inputs and an output, one of the inputs being capable of being coupled to the TIP line and the other being capable of being coupled to the RING line so that no matter which of the two lines has power applied, current flows to the output;

e) a load circuit coupled to the bridge rectifier output;

f) a probe capable of detecting electro-magnetic signals;

g) a high impedance buffer having an input and an output, the input being coupled to the probe; and h) an amplifier circuit having a input and an output, the input being coupled to both the loaded rectifier output and to the buffer output, the amplifier being capable of detecting, amplifying, and producing an output in response to either the rectifier output or to buffer output signals, the amplifier circuit being capable of selectively amplifying signals based on the frequency of the signals.

7. The tester of claim 6 wherein the load circuit has an over-current protection circuit so as to prevent load circuit destruction should the tester be accidentally attached to wire capable of delivering current in excess of that normally found on analog phone lines.

8. The tester of claim 6 further comprising a power switching circuit comprising:

a) a line activated power switch having an input and an output, the line activated switch being responsive to the rectifier output so that when the signal is present at the rectifier output, power is applied to both the amplifier and the buffer; and b) a momentary switch capable of applying power to both the amplifier and the buffer when activated.

9. The tester of claim 6 further comprising a speaker coupled to the amplifier output capable of producing an audible response to the amplifier output signals.

10. The tester of claim 6 wherein the load circuit further comprises a load resistor having a first and a second end, the first end being connected to the rectifier output, and wherein the over-current protection circuit comprises a by-pass transistor having a base, an emitter, and a collector, the transistor base being coupled to the second end of the load resistor and resistively coupled to ground via a threshold resistor, the transistor collector being coupled to the rectifier output, the transistor emitter being coupled to ground, the threshold resistor having a value such that it causes the transistor to turn on and limit the current through the load resistor so as to prevent it from being exposed to current in excessive of its specified limit.

11. The tester of claim 9 wherein the over-current protection circuit further comprises a primary load transistor having a base, an emitter, and a collector, the primary transistor base being coupled to the rectifier output, and wherein the by-pass transistor base is coupled to the load resistor via the primary transistor so that the by-pass transistor base is coupled to the primary transistor emitter and the primary transistor collector is coupled to the second end of the load resistor, and wherein the load circuit further comprises an indicator light coupled across the primary transistor's collector and emitter so that when the by-pass transistor turns on, the indicator light illuminates.

12. A multi-function tester for testing phone lines having a TIP line and a RING line, the tester comprising:

a) a modular plug-in connector;

b) a bridge rectifier circuit having two inputs and an output, one of the inputs being capable of being coupled via the modular connector to the TIP line and the other being capable of being coupled via the modular connector to the RING line so that no matter which of the two lines has power applied, current flows to the output;

c) a load circuit coupled to the bridge rectifier output, the load circuit having an over-current protection circuit further comprising:

(i) a load resistor having a first and a second end, the first end being connected to the rectifier output, and wherein the over-current protection circuit comprises a by-pass transistor having a base, an emitter, and a collector, the transistor base being coupled to the second end of the load resistor and resistively coupled to ground via a threshold resistor, the transistor collector being coupled to the rectifier output, the transistor emitter being coupled to ground, the threshold resistor having a value such that it causes the transistor to turn on and limit the current through the load resistor so as to prevent it from being exposed to current in excessive of its specified limit; and (ii) a primary load transistor having a base, an emitter, and a collector, the primary transistor base being coupled to the rectifier output, the by-pass transistor base being coupled to the load resistor via the primary transistor so that the by-pass transistor base is coupled to the primary transistor emitter and the primary transistor collector is coupled to the second end of the load resistor;

d) an over-current indicator light coupled across the primary transistor's collector and emitter so that when the by-pass transistor turns on, the indicator light illuminates.

e) a probe capable of detecting electro-magnetic signals;

f) a high impedance buffer having an input and an output, the input being coupled to the probe; and g) an amplifier circuit having a input and an output, the input being coupled to both the loaded rectifier output and to the buffer output, the amplifier being capable of detecting, amplifying, and producing an output in response to either the rectifier output or to buffer output signals, the amplifier circuit being capable of selectively amplifying signals based on the frequency of the signals.

13. The tester of claim 12 further comprising a power switching circuit comprising:

a) a line activated power switch having an input and an output, the line activated switch being responsive to the rectifier output so that when the signal is present at the rectifier output, power is applied to both the amplifier and the buffer; and b) a momentary switch capable of applying power to both the amplifier and the buffer when activated.

14. The tester of claim 12 further comprising a speaker coupled to the amplifier output capable of producing an audible response to the amplifier output signals.

15. The tester of claim 12 further comprising two clip lead terminals, one terminal being coupled to the TIP line and the other to the RING line.

16. A multi-function tester for testing phone lines having a TIP and a RING line, the tester comprising:

a) a bridge rectifier circuit having two inputs and an output, one of the inputs being capable of being coupled to the TIP line and the other being capable of being coupled to the RING line so that no matter which of the two lines has power applied, current flows to the output;

b) a load circuit coupled to the bridge rectifier output;

c) a probe capable of remotely detecting electro-magnetic signals;

d) a high impedance buffer having an input and an output, the input being coupled to the probe;

e) an amplifier circuit having a input and an output, the input being coupled to both the loaded rectifier output and to the buffer output, the amplifier being capable of detecting, amplifying, and producing an output in response to either the rectifier output or to probe detected signals, the amplifier circuit being capable of selectively amplifying signals based on the frequency of the signals;

f) a battery coupled to the buffer and to the amplifier circuit; and g) a power switching circuit for coupling the battery to the buffer and to the amplifier circuit, the power switching circuit comprising an off-hook activated switch circuit and a momentary type trace switch so that the power switching circuit provides battery power to the buffer and to the amplifier circuit when either the rectifier output current turns on the off-hook switch circuit or when the trace switch is closed.

17. A testing tool as in claim 1 wherein the first-named sound signal channel input is a signal input; the sound channel has an additional and separate energizing input; which further includes an internal power supply, and a line-actuated switch responsive to detection of dial tone by the dial tone detection circuit for coupling power from the power supply to the sound channel energizing input; and wherein the momentary switch when depressed couples power from the power supply to the sound channel energizing input.

* * * * *